US008209619B2

(12) United States Patent
Carrer et al.

(10) Patent No.: US 8,209,619 B2
(45) Date of Patent: Jun. 26, 2012

(54) NON-LINEAR NAVIGATION IN DISCUSSION FORUMS

(75) Inventors: Marco Carrer, Reading, MA (US); David Mor, Merrimack, NH (US); Gopalan Arun, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1312 days.

(21) Appl. No.: 11/724,857

(22) Filed: Mar. 16, 2007

(65) Prior Publication Data
US 2008/0229236 A1    Sep. 18, 2008

(51) Int. Cl.
*G06F 3/00* (2006.01)
(52) U.S. Cl. ........ 715/757; 715/751; 715/786; 709/204; 709/217; 709/218; 709/219
(58) Field of Classification Search ............... 715/751, 715/786; 709/204, 217–219
See application file for complete search history.

(56) References Cited

U.S. PATENT DOCUMENTS

| | | | | |
|---|---|---|---|---|
| 5,812,134 | A * | 9/1998 | Pooser et al. | 715/848 |
| 6,020,884 | A * | 2/2000 | MacNaughton et al. | 715/747 |
| 6,557,027 | B1 | 4/2003 | Cragun | |
| 6,571,235 | B1 | 5/2003 | Marpe | |
| 6,594,652 | B1 | 7/2003 | Sunaga et al. | |
| 6,769,010 | B1 | 7/2004 | Knapp et al. | |
| 6,795,830 | B1 | 9/2004 | Banarjee et al. | |
| 6,804,668 | B1 | 10/2004 | Shambaugh et al. | |
| 6,993,657 | B1 | 1/2006 | Renner et al. | |
| 7,007,069 | B2 | 2/2006 | Newman et al. | |
| 7,305,436 | B2 * | 12/2007 | Willis | 709/204 |
| 2005/0114781 | A1 * | 5/2005 | Brownholtz et al. | 715/733 |
| 2005/0125504 | A1 * | 6/2005 | Leeds | 709/217 |
| 2005/0144568 | A1 * | 6/2005 | Gruen et al. | 715/822 |
| 2005/0198128 | A1 | 9/2005 | Anderson et al. | |
| 2005/0198305 | A1 | 9/2005 | Pezaris et al. | |
| 2005/0273714 | A1 | 12/2005 | Beartusk et al. | |
| 2006/0026593 | A1 | 2/2006 | Canning et al. | |
| 2006/0063991 | A1 * | 3/2006 | Yu et al. | 600/322 |
| 2006/0080161 | A1 | 4/2006 | Arnett et al. | |
| 2006/0080162 | A1 | 4/2006 | Arnett et al. | |
| 2006/0085248 | A1 | 4/2006 | Arnett et al. | |
| 2006/0112036 | A1 | 5/2006 | Zhang et al. | |
| 2006/0112392 | A1 | 5/2006 | Zhang et al. | |
| 2006/0129935 | A1 * | 6/2006 | Deinlein et al. | 715/733 |
| 2007/0022180 | A1 | 1/2007 | Cocotis et al. | |
| 2007/0226205 | A1 * | 9/2007 | Carrer et al. | 707/5 |
| 2008/0208975 | A1 * | 8/2008 | Olive | 709/205 |

OTHER PUBLICATIONS

PCT International Search Report and Written Opinion of the International Searching Authority having a date of mailing of Nov. 21, 2008, in co-pending PCT International Patent Application No. PCT/US08/03102, having an International Filing Date of Mar. 7, 2008, with the applicant of Oracle International Corporation and entitled: Non-Linear Navigation in Discussion Forums.

* cited by examiner

*Primary Examiner* — Ryan Pitaro
(74) *Attorney, Agent, or Firm* — Kraguljac Law Group LLC

(57) ABSTRACT

Systems, methods, and other embodiments associated with providing non-linear navigation in a discussion forum are described. One method embodiment includes maintaining a location data that identifies a thread or message to which a user has navigated. The method also includes manipulating a navigation control in a graphical user interface based on actions taken by the user and/or other users of the system. The navigation control facilitates a user moving to points not traditionally reachable in a single vertical navigation step in a discussion forum interface.

32 Claims, 8 Drawing Sheets

NON-LINEAR NAVIGATION IN DISCUSSION FORUMS

BACKGROUND

Discussion forums continue to grow in both size and importance. As more and more information comes to reside in discussion forums, shortcomings associated with traditional discussion forum navigation schemes become more pronounced. Conventional discussion forum navigation involves moving up and/or down through a discussion forum hierarchy looking for and interacting with threads and/or messages. Moving between two threads can involve navigating all the way back up to the top of a hierarchy, either in steps or all at once, and then navigating down through the hierarchy to the desired thread. A user may easily get lost and/or distracted as they move through the hierarchy using this rigid step-by-step approach.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Figure 1:
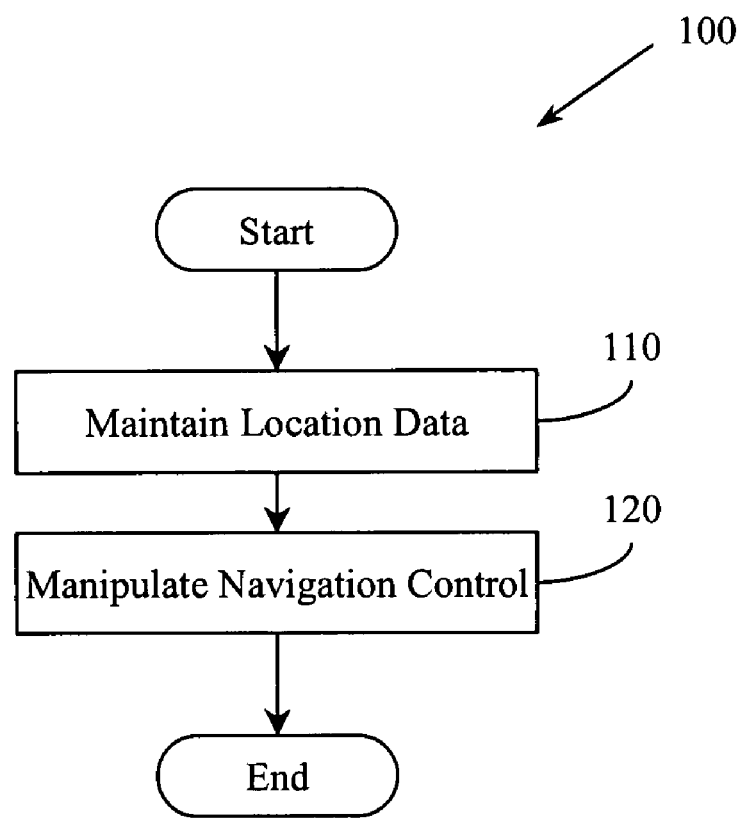
FIG. 1 illustrates a method associated with non-linear navigation in a discussion forum.

Example systems and methods facilitate non-linear navigation in a discussion forum (DF). In one example, non-linear navigation may be referred to as horizontal navigation. Conventionally, users would enter a discussion forum at the top of a hierarchy. The hierarchy would be pre-defined by a DF administrator. Users would then navigate down into the DF to find threads of interest and would then navigate down into a thread to find messages of interest. Users could navigate up and down through a DF. In some cases a user may even have been able to mark a message in the hierarchy to which the user could return. This vertical navigation provided useful, but limited, navigation options.

Thus, example systems and methods provide a graphical user interface (GUI) and/or GUI element that facilitates navigation options other than traditional vertical choices. For example, systems and methods may provide options for navigating from a first location to a second location that can not be reached in a single traditional vertical navigation step. By way of illustration, the locations to which a user may navigate may include favorite locations for this user, favorite locations for other users, active locations, automatically suggested locations, user recommended locations, highly ranked locations, and so on.

In one example, a method may include maintaining a location data in a tangible medium (e.g., computer memory). The location data may identify a first logical point in a DF hierarchy to which a user has navigated. The method may also include selectively manipulating a navigation control on a GUI based on the location data. For example, as a user navigates through a discussion forum, different choices may be automatically determined to be more or less relevant to the user and thus may be added and/or removed from the GUI and/or GUI element. In one example, the method may include manipulating the navigation control to provide access to a second logical point in the DF hierarchy that is not reachable from the first logical point in a single vertical navigation step. The navigation control may also receive user inputs. Thus, the method may include selectively relocating the user to a second logical point in the DF hierarchy by manipulating the location data.

Consider the following example. A user enters a recreation oriented DF. At the top level, threads or links to collections of threads concerning many recreational activities may be available. For example, the DF may be divided into areas that concern swimming, biking, running, triathlon, and rock climbing, among others. At the top most level of the DF hierarchy, a non-linear navigation tool may provide a user with direct paths to entries located deep in the hierarchy. These may be entries the user has visited before, entries the user has identified as being important or interesting, entries that are currently very active, and so on.

When the user navigates down to the biking level, the non-linear navigation tool may be updated to provide a different set of direct paths to a different set of entries. For example, direct paths to swimming entries may be limited while direct paths to mountain biking entries, road biking entries, cyclocross entries, and Tour de France entries may be provided. Additionally, navigation paths to more narrowly focused messages than were provided at the top level may be provided.

At the general biking level, the user may visit a few threads and read a few messages to see what is going on in different areas. Upon noticing an interesting message concerning a mountain bike race, the user may navigate deeper into the DF and reach a set of mountain biking threads. Once again the navigational tool can be updated based both on the messages that were read and the lower level to which the user navigated. The user may read and reply to several messages and may post a message concerning hotel accommodations near an upcoming mountain bike race location. While the main topic is still mountain biking, an additional topic (e.g., hotels in New Hampshire) may be involved. Rather than being forced to navigate all the way back to the top of the DF and then navigate down to threads concerning hotels in New Hampshire near the mountain bike race and friendly to mountain bikers and their bikes, the user may be able to navigate directly to such threads using navigation options provided on the non-linear navigation tool. These options may be provided automatically by the system, may be provided by other users who have asked similar questions, and so on. After reading about hotels for a while, the user may wish to return to the mountain biking thread to see if anyone has replied to their post. Once again the non-linear navigation tool may provide a direct path to the post and its reply.

Thus, non-linear navigation may provide a per user unique view of a DF. The unique view may be generated using a combination of fully automated techniques as well as some techniques that require manual intervention. The non-linear navigation facilitates quickly identifying interesting messages, keeping abreast of new developments in targeted threads, moving quickly to automatically generated suggestions, moving quickly to user selected recommendations, moving quickly to related messages, and so on. Thus, the non-linear navigation provides new ways to traverse, explore, and discover messages in a threaded discussion system.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Logic", as used herein, includes but is not limited to hardware, firmware, software stored on a machine-readable storage medium and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. Where multiple logical logics are described, it may be possible in some examples to incorporate the multiple logical logics into one physical logic. Similarly, where a single logical logic is described, it may be possible in some examples to distribute that single logical logic between multiple physical logics.

"Machine-readable medium", as used herein, refers to a medium that participates in directly or indirectly providing signals, instructions and/or data that can be read by a machine (e.g., computer). A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), CD-ROM (Compact Disk ROM), and so on.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software stored on a machine-readable storage medium). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners. Software is fixed in a tangible medium.

"Thread" is used herein in the discussion-forum context manner. Thus, a thread refers to a set of related communication elements (e.g., messages, postings) through which it is possible to navigate based on data related to the communication elements.

"User", as used herein, includes but is not limited to, one or more persons.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, identifying, automatically performing an action, and so on, refer to actions and processes of a computer system, logic, processor, or similar electronic device that manipulates and transforms data represented as physical (electric, electronic, magnetic) quantities and stored in a tangible medium.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time. In some examples, methods may be implemented as processor executable instructions. Thus, a machine-readable medium may store processor executable instructions that if executed by a machine (e.g., processor) cause the machine to perform a method.

FIG. 1 illustrates a method 100 associated with non-linear navigation in a discussion forum. Machine-executable instructions may be stored on a tangible medium and, if executed by a machine, may cause the machine to perform method 100. Method 100 may include, at 110, maintaining a location data in a tangible medium. The tangible medium may be, for example, a computer memory. The location data stores information to identify a first logical point in a discussion forum (DF) hierarchy to which a first user has navigated. The user may have navigated to this point using a conventional vertical navigation. The user may have navigated to this point using non-linear navigation as provided herein. The logical point may be, for example, a thread, a message, and so on. Maintaining location data on a per user basis facilitates providing a unique per-user view of a DF.

Method 100 may also include, at 120, selectively manipulating a navigation control on a graphical user interface (GUI). The navigation control may be, for example, a button, a menu, an icon, and so on. The selective manipulation may be based, for example, on the location data. The manipulation may include, for example, adding navigation destinations to the GUI, removing navigation destinations from the GUI, changing navigation destinations available on the GUI, and so on. The manipulation may include adding buttons, removing buttons, adding icons, removing icons, adding menu items, removing menu items, changing buttons, icons, and/or menu items, and so on.

The navigation control is to provide access to a second logical point in the DF hierarchy. The second logical point may not be reachable from the first logical point in a traditional single vertical navigation step. The second logical point may be, for example, a favorite message, a favorite thread, an active message, an active thread, a recently read message, a response to a post, and so on. The second logical point may also be, for example, a message and/or thread related to a message and/or thread being viewed by a DF user. The relation may be based, for example, on similar authoring, similar content, similar posting activity, and so on. The second logical point may also be, for example, a message and/or thread that is suggested by the DF. The suggestion may be based, for example, on historical actions by a user. These historical actions may be viewed in light of ongoing system activity. The second logical point may also be, for example, a message and/or thread that is recommended by another user. For example, a user visiting a Tour de France thread may be provided with a GUI element that facilitates relocating to a message in a thread recommended by Lance Armstrong. The second logical point may also be, for example, a message and/or thread that has attained a ranking that exceeds a threshold and/or that is at or near the top of a relative ranking of messages and/or threads. The rankings may be based on explicit user rankings, on administrator rankings, on voted rankings, and so on. While several second logical points are described, it is to be appreciated that other relocation points may also be identified and made available to the user.

Figure 2:
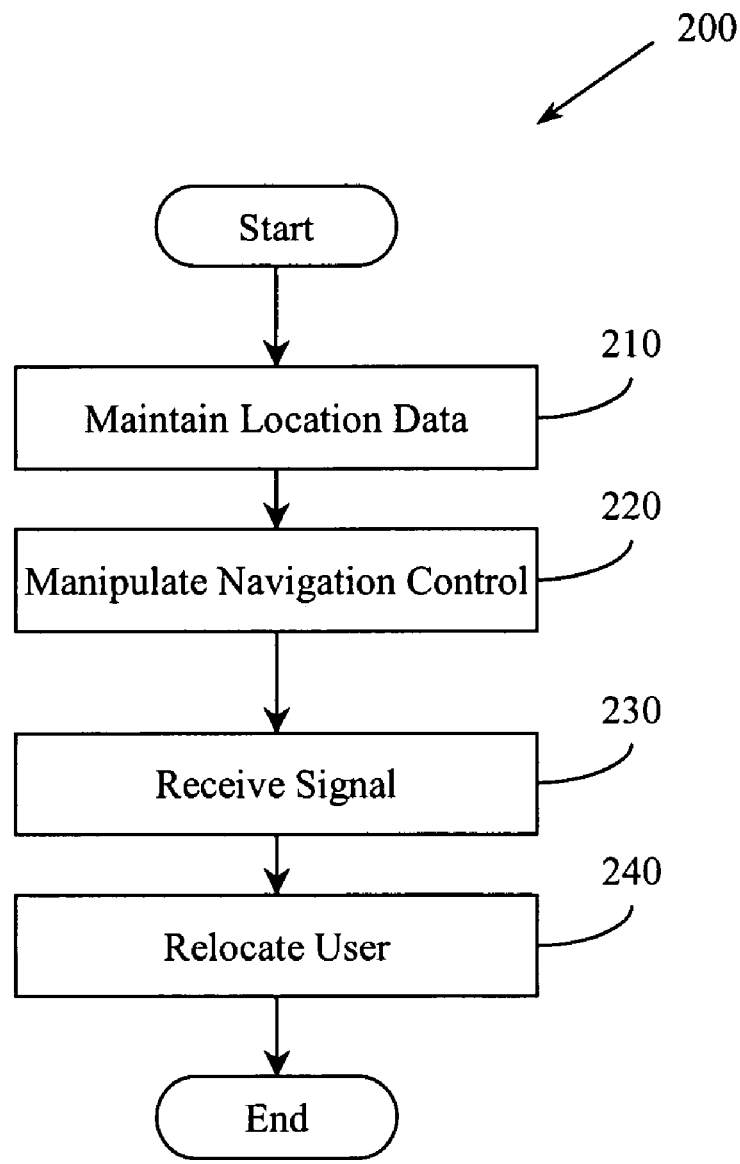
FIG. 2 illustrates a method associated with non-linear navigation in a discussion forum.

FIG. 2 illustrates a method 200 associated with non-linear navigation in a discussion forum. Method 200 includes some elements similar to those associated with method 100 (FIG. 1). For example, method 200 includes, at 210, maintaining location data, and, at 220, manipulating a navigation control. However, method 200 includes additional actions.

For example, method 200 includes, at 230, receiving a signal from the navigation control. The signal may be related to actions including, for example, the user providing a ranking for a thread and/or message, the user establishing a bookmark to a thread and/or message, the user establishing a link to a thread and/or message, and so on. The signal may also be related to other actions taken by the user. The actions may include, for example, viewing a message in the DF, posting a message to the DF, replying to a message in the DF, and so on. These actions may indicate that a user is interested in a certain message, in a certain topic, and so on. Data concerning these actions may be collected and used to customize the navigation control, as will be described below in connection with method 300 (FIG. 3).

Method 200 may also include, at 240, selectively relocating the first user to a second logical point in the DF hierarchy by manipulating the location data. The manipulating may depend, at least in part, on the signal received at 230. For example, a user action may lead to a signal being received that indicates that the user wants to relocate to a different location. The user action may be, for example, clicking on an icon, selecting a menu item, and so on. The relocating may involve logically repositioning the user at a new location that is not linearly connected to the first logical point.

Figure 3:
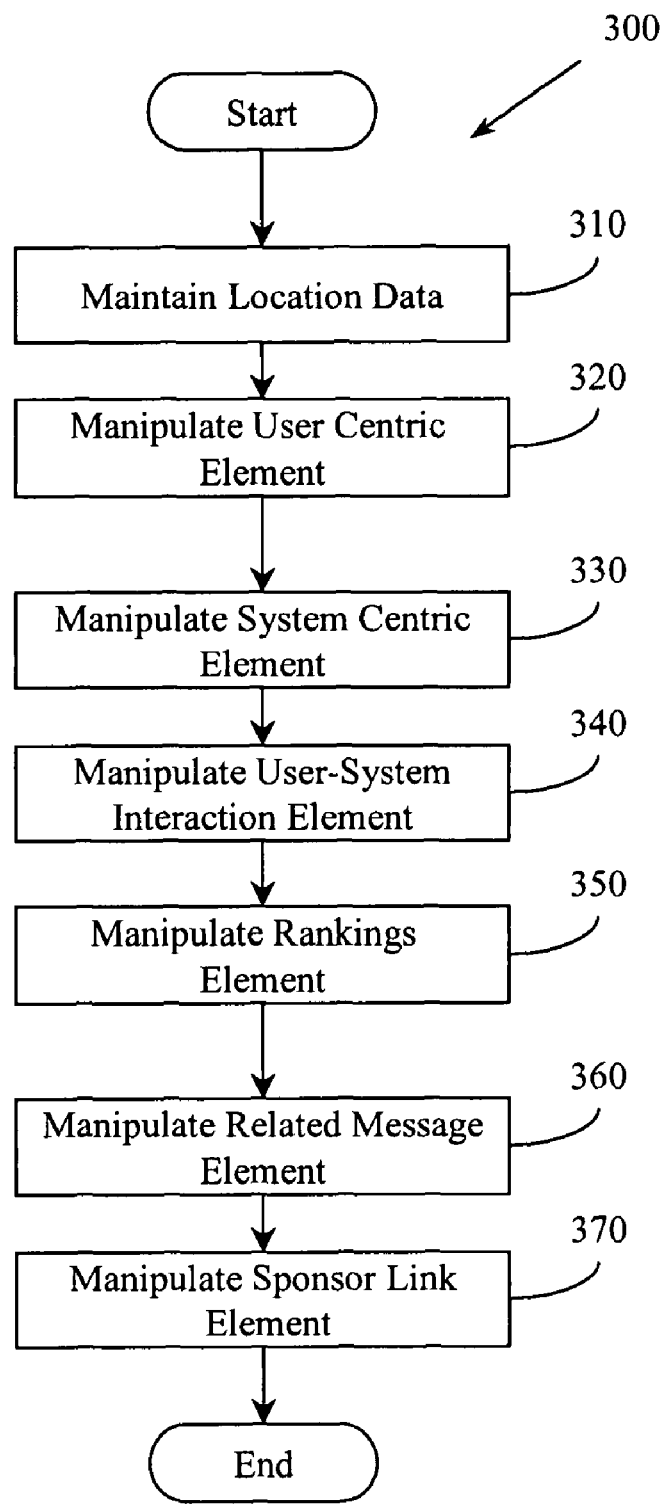
FIG. 3 illustrates a method associated with non-linear navigation in a discussion forum.

FIG. 3 illustrates a method 300 associated with non-linear navigation in a discussion forum. Method 300 includes some actions similar to those described in connection with method 100 (FIG. 1). For example, method 300 includes, at 310, maintaining location data. However, method 300 includes additional actions that describe in more detail how a navigation control on a GUI may be manipulated.

For example, method 300 may include, at 320, manipulating a user-centric element on a GUI. The user-centric element may be related to actions taken by a DF user. For ease of discussion of method 300, the "current user", or the user to whom the GUI is being presented, may be referred to as the "first user". The actions the first user may take that may contribute to the manipulation of the user-centric element include, but are not limited to, viewing a message in the DF, posting a message to the DF, replying to a message in the DF, establishing a bookmark to a message in the DF, and establishing a link to a message in the DF. These actions may lead to the contents of the user-centric element being updated. For example, a history of messages read by a user may be maintained and the N most recent reads (N being an integer) may be made available in the user-centric element. N may be a pre-defined, user-configurable member. In another example, if a user spends a certain amount of time viewing messages in a certain thread, then the user-centric element may be updated to facilitate easy return to the thread. Similarly, if a user replies to a certain number of messages in a thread then messages related to that thread and/or messages posted in response to the user postings may be added to the user-centric element. Additionally, messages and/or threads that a user bookmarks or establishes a link to may be added to the user-centric element. A link may be established when a user embeds an identifier (e.g., URL (uniform resource locator)) associated with a message into, for example, an email. The actions may also include, for example, posting a reply to a message. Since the user posted a reply, the user may be interested in returning to that location at a later point in time to determine whether anyone else viewed the post and provided any additional feedback. The user-centric element may be updated to facilitate non-linear navigation from other parts of the DF to the post. Thus, the user-centric element may have groups including a my favorites group, a my recent reads group, a my post group, and so on.

Manipulating the user-centric element may have a temporal aspect. For example, more recent actions may be weighted more heavily than less recent actions in determining whether and/or how to update a user-centric element. Also, a time limit may be imposed on how long an action is considered relevant for manipulating purposes. Thus, in one example, only actions taken by the first user that occur within a pre-determined period of time may be considered when determining whether and/or how to update the user-centric element.

Method 300 may also include, at 330, manipulating a system-centric element on a GUI. The contents of the system-centric element may depend on an action taken by a user other than the first user. For example, another DF user or a set of other DF users may be taking actions about which the first user may be interested. Consider a situation where other DF users are viewing a certain set of messages and posting a large number of replies to the messages. The first user may wish to be notified of this activity and may wish to be able to navigate directly to the relevant thread and/or messages without engaging in traditional up/down vertical navigation. Furthermore, the user may wish to be able to jump to the hot area and then jump right back to where they were. The actions taken by the other users may include, for example, viewing a message in the DF, posting a message to the DF, replying to a message in the DF, establishing a bookmark to a message in the DF, and establishing a link to a message in the DF. While five actions are described, it is to be appreciated that a greater and/or lesser number of actions may be acted upon. Thus, the system-centric element may have groups including a most read group, a most posted group, a most referenced group, and so on.

Method 300 may also include, at 340, manipulating a user-system interaction element on a GUI. While the user-centric element dealt with user actions, and while the system-centric element dealt with the actions of other users, the user-system interaction element deals with interactions between the first user and other users. For example, the contents of the user-system interaction element may include a computer-generated suggestion for a message for the first user to view. The computer-generated suggestion may depend on analysis of relations between first user actions and actions of others. By way of illustration, a user may be viewing messages dealing with a certain topic. Other users may also be viewing messages dealing with the same topic but in a different thread. Thus, the user-system interaction element may be updated with messages having a topic that may be generic to both those being read by the first user and other users. These messages may be viewed as "suggestions" (e.g., start here, background information) rather than as "related messages" that are handled by a related messages element described below. Additionally, and/or alternatively, a DF system may analyze user actions and detect certain topics or themes in which the user is interested. The DF system may correlate the themes with current events (e.g., today's news, recent news) and provide suggestions based on the correlation.

In another example, the contents of the user-system interaction element may depend on a user-generated recommendation for a message for the first user to view. Unlike the computer-generated suggestion, this message(s) may be identified by a certain user (e.g., Lynn Hill) as being relevant to people who are viewing a thread about rock climbing camps that include personalized instruction by world champions. Additionally and/or alternatively, the user-generated suggestion may come from a moderator or monitor of the DF. The moderator may note that a couple of users are researching the same topic at the same time and may put the entry point to a relevant thread onto their navigation tool. Thus, the user-system interactions element may have groups including a system suggestion group, a user recommendation group, and so on.

Method 300 may also include, at 350, manipulating a rankings element on a GUI. The contents of the rankings element may depend on explicit rankings provided by the first user and/or by other users. For example, as a user views threads and/or messages, the user may be prompted to enter a value that indicates how valuable and/or how relevant a thread and/or message was. More relevant items may be identified and thus the rankings element may include non-linear navigation paths to those relevant or highly ranked items. In another example, rankings established by other users and/or sets of users may be added to the rankings element. For example, a set of world famous rock climbers (e.g., Lynn Hill, Timmy Caldwell, Lisa Rands) may read messages in a certain DF. Their activity may include ranking threads and/or messages that provide useful rock climbing information ("beta"). A user who spends a certain amount of time following rock climbing threads may receive on their navigation tool information based on these rankings from other people. The rankings element may, in different examples, include a fixed size set of entries, a user-configurable sized set of entries, entries that score above a pre-determined relevance threshold, entries that score above a relative relevance threshold, and so on. Thus, a rankings element may have groups including a my rankings group, a my experts ranking group, a system experts ranking group, and so on.

Method 300 may also include, at 360, manipulating a related message element on a GUI. A related message may be a message that shares a common author, a common topic, a common theme, a common set of readers, or other indicia of relatedness. The indicia may be identified by automatically examining different sets of data and a relationship(s) found in the data. For example, data associated with the first user may describe messages the user has viewed, messages the user has posted, messages to which the user has replied, messages to which the user has established a link, messages the user has bookmarked, and so on. Similarly, data associated with other users may describe messages other users have viewed, messages other users have posted, messages to which other users have replied, messages to which other users have established links, messages to which other users have established bookmarks, and so on. The related messages element may be manipulated to include navigational paths to messages that include certain degrees of indicia of relatedness. Thus, rather than having to seek out interesting related messages, a user may be presented with such information. Furthermore, the user may navigate directly to these interesting related messages without a traditional up then down navigation through a DF. Thus, a related messages element may have groups including a related topic group, a related date group, a related author group, and so on.

In one example, method 300 may even include, at 370, manipulating a sponsor link navigation element on the GUI. A sponsor link may be more commonly referred to as an advertisement link. Some discussion forums are run by and/or supported by advertisers. In return for providing a forum in which certain topics can be discussed, the sponsors place ads or moderate discussions of certain advertised items. For example, a mountain biking company may provide computer hardware and software to support a DF concerning mountain biking. When a user posts a message about a certain mountain biking destination, a sponsor link for a bike shop in or near that destination may be added to the sponsor link element on the navigation tool.

Figure 4:
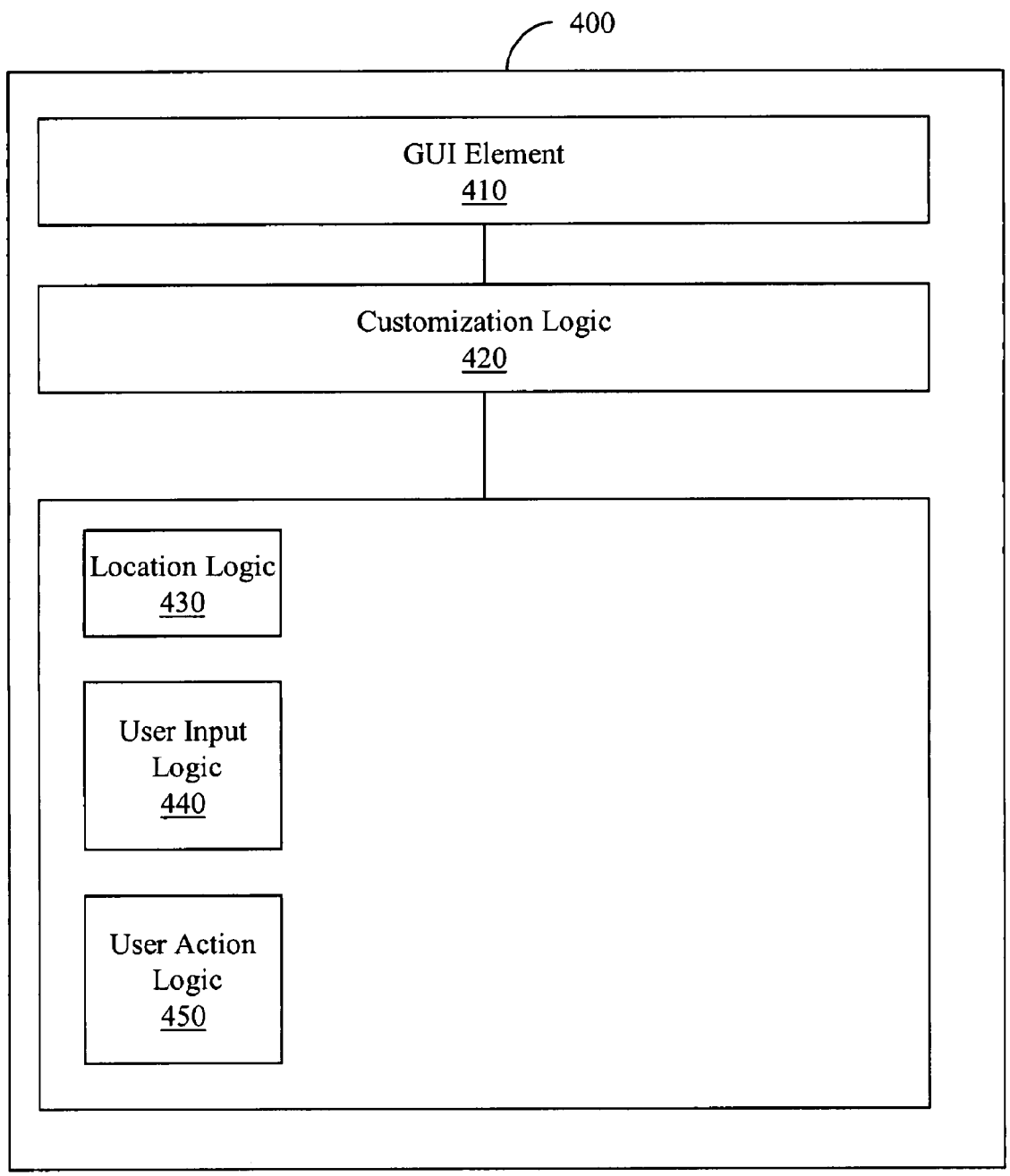
FIG. 4 illustrates a system associated with non-linear navigation in a discussion forum.

FIG. 4 illustrates a system 400 associated with non-linear navigation in a discussion forum. System 400 may be referred to as a non-linear DF navigation system. System 400 may include a GUI element 410. GUI element 410 may display a set of non-linear navigation options to a DF user. GUI element 410 may also receive a non-linear navigation signal. The non-linear navigation options may facilitate navigation to favorite locations, to interesting locations, to related locations, to suggested locations, and so on. GUI element 410 may be displayed as part of a GUI associated with a DF. In one example, GUI element 410 may be integrated into a DF interface while in another example GUI element 410 may be separate from but displayed contemporaneously with a DF interface. For example, GUI element 410 may be overlaid on top of a DF interface.

System 400 may also include a location logic 430. Location logic 430 may determine a location to which a first user has navigated in a DF. For example, a user may navigate to a thread, to a message, and so on. In different examples the location may be stored as an address, as a URL, and so on.

System 400 may also include a user input logic 440. User input logic 440 may receive a signal from the first user through the GUI element 410. The signal may be related to various actions. For example, the signal may be related to a user providing a ranking for a message, a user establishing a bookmark to a message, a user establishing a link to a message, and so on. Thus the signal may facilitate identifying messages in which a user is currently interested and may therefore be interested in the future. Furthermore, the signal may facilitate gathering information to which other user actions can be compared to determine, for example, related messages, suggested messages, and so on.

System 400 may also include a user action logic 450. User action logic 450 may facilitate identifying a DF action taken by the first user. The first user may take different actions in a DF. For example, the DF action may be viewing a message in the DF, posting a message to the DF, replying to a message in the DF, and so on. Once again, the action taken by the user may provide information about the threads, messages, topics, and so on, in which a user is currently interested. This information may be used to customize the GUI element 410 to provide non-linear navigation paths to threads and/or messages based on the user actions.

System 400 may also include a customization logic 420. Customization logic 420 facilitates selectively customizing the GUI element 410. The customizing may be based, at least in part, on the signal received from the user input logic 440, and/or on the DF action identified by the user action logic 450. Customizing the GUI element 410 may include, for example, adding menu items, removing menu items, adding buttons, adding icons, changing visible items, and so on. These items may provide navigation paths to locations in a DF that may not be reached in a timely and/or efficient manner using traditional vertical navigation. Thus, system 400 facilitates non-linear navigation to locations based, at least in part, on what a user has done.

Figure 5:
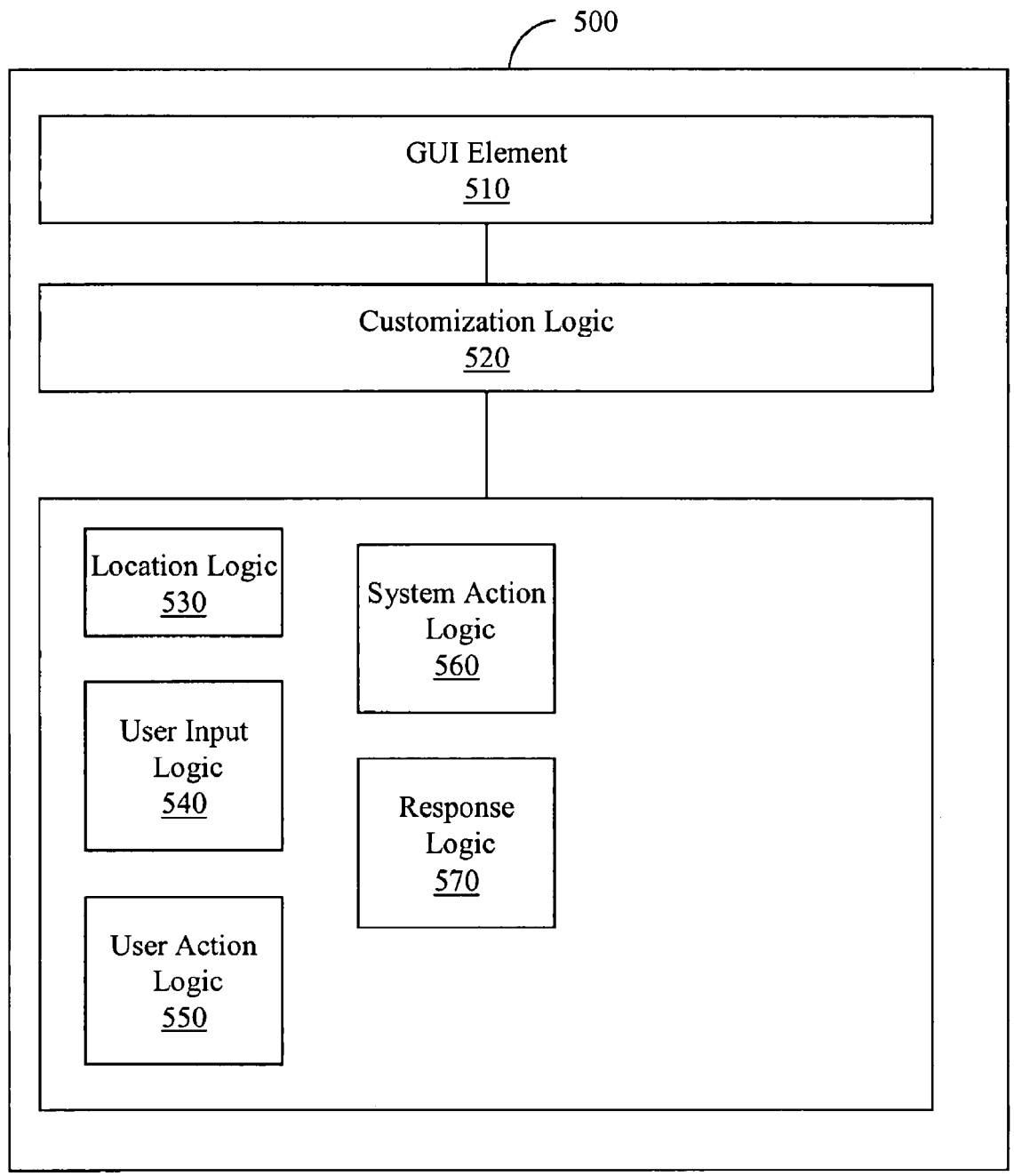
FIG. 5 illustrates a system associated with non-linear navigation in a discussion forum.

FIG. 5 illustrates a system 500 that includes the user-centric components of system 400 (FIG. 4) and adds components that deal with what other users of a DF are doing. System 500 includes some elements similar to those described in connection with system 400. For example, system 500 includes a GUI element 510, a customization logic 520, a location logic 530, a user input logic 540, and a user action logic 550. However, system 500 also includes a system action logic 560 and a response logic 570.

System action logic 560 facilitates identifying an action taken by a system user other than the first user. In different examples, system action logic 560 may identify actions taken by all users, by identified subsets of users, by users that the first user has identified as being relevant, and so on. The actions taken by users other than the first user may include, for example, viewing a message in the DF, posting a message to the DF, replying to a message in the DF, establishing a bookmark to a message in the DF, and establishing a link to a message in the DF. Identifying actions taken by other users facilitates identifying interesting locations to which the first user can be provided non-linear navigation paths. For example, if a large number of users are making posts about Paris Hilton, then the first user may be provided with a path to navigate to the head of a thread about the socialite even though the user is in a completely different portion of a DF that deals with rock climbing.

Response logic 570 facilitates identifying a response of a second user to a message posted by the first user. After making a post, a user may navigate to a different area of the DF. However, the user may be interested in determining when and/or whether anyone replies to their post. Thus, when the response logic 570 notices that a reply has been posted, the response logic 570 may provide information to the customization logic 520 and/or may control the customization logic 520 to update the GUI element 510. Since the user may be in a completely different part of the DF, direct, non-linear navigation to the reply and then back to the subsequent location will provide efficient, non-distracting navigation.

Figure 6:
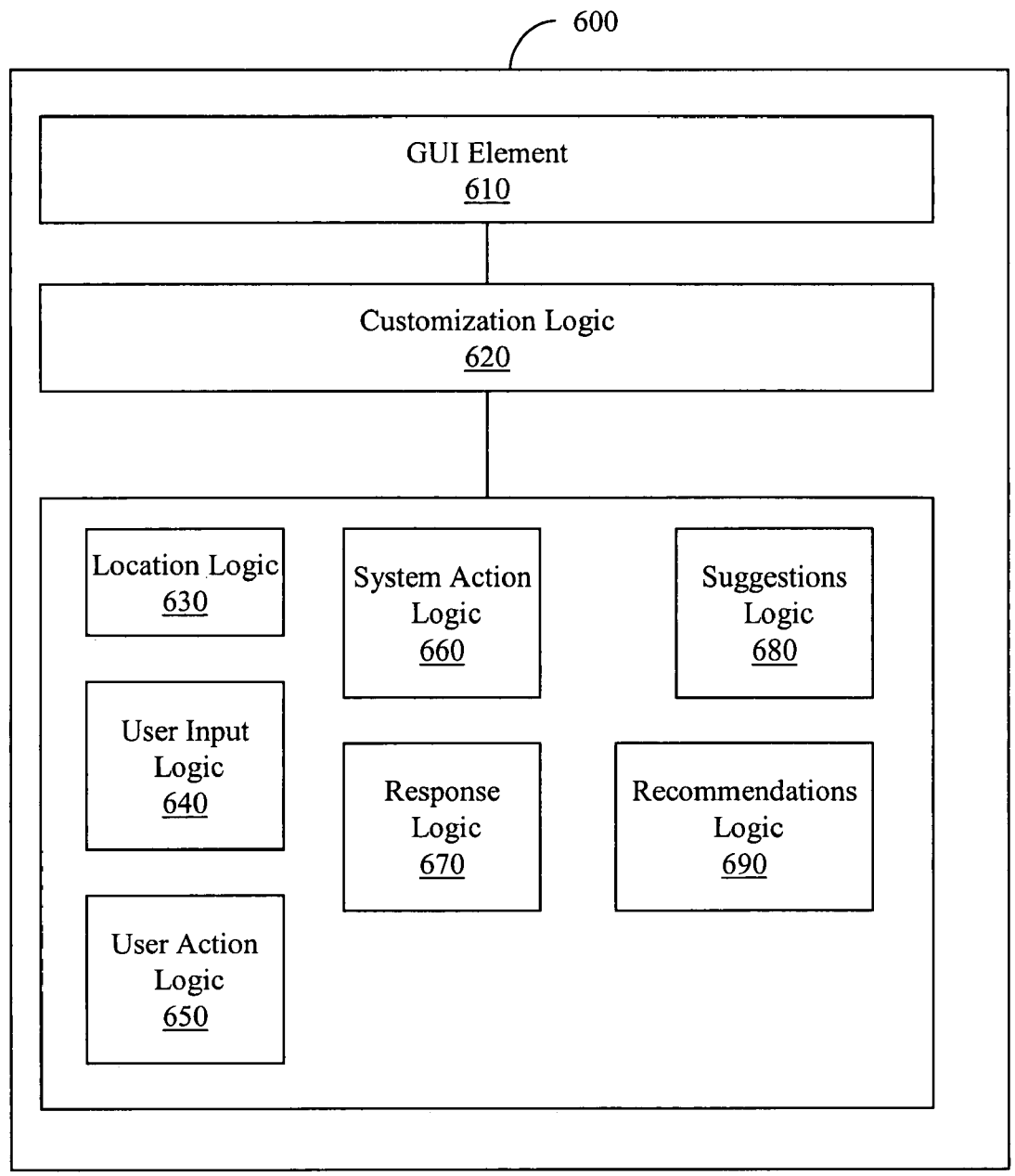
FIG. 6 illustrates a system associated with non-linear navigation in a discussion forum.

FIG. 6 illustrates a system 600 that includes the user-centric components of system 400 (FIG. 4) and the system-centric components of system 500 (FIG. 5). For example, system 600 includes a GUI element 610, a customization logic 620, a location logic 630, a user input logic 640, a user action logic 650, a system action logic 660, and a response logic 670. However, system 600 also includes a suggestions logic 680 and a recommendations logic 690.

Suggestions logic 680 facilitates identifying a suggested message to present to the first user via the GUI element 610. The suggested message may be located in a different part of the DF, an area that may be difficult to navigate to using conventional up/down navigation. The suggested message may be automatically identified based on a set of first user actions. For example, a user may read a set of messages and then post a message. System 600 may identify a topic or theme associated with the messages read and the message posted. Suggestions logic 680 may then identify messages (e.g., responses to frequently asked questions, background material, entry points) that are relevant to the user as indicated by the user actions.

Recommendations logic 690 facilitates identifying a recommended message to present to the first user via the GUI element 610. Unlike the suggested message provided by suggestions logic 680, which is automatically identified, the recommended message is provided by a user. While it may be provided by a user, some automation may also be involved. For example, the recommended message may be provided by an expert in a field and recommended to the set of users who post a question that includes certain keywords. Thus, the recommendations logic 690 may note the keywords, identify a user(s) that posts a query containing those keywords, and then provide the recommended message.

Figure 7:
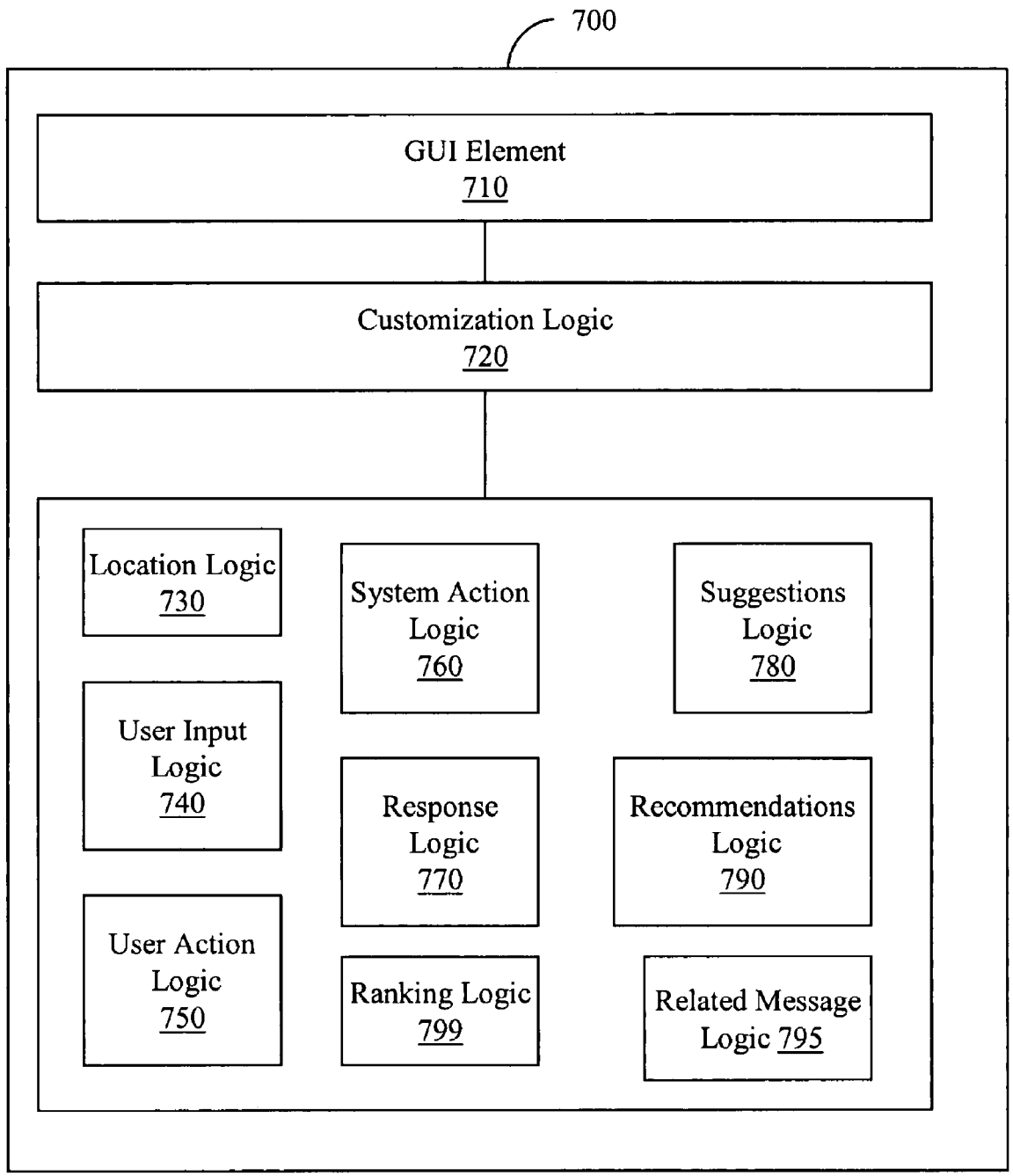
FIG. 7 illustrates a system associated with non-linear navigation in a discussion forum.

FIG. 7 illustrates a system 700 that includes the user-centric components of system 400 (FIG. 4), the system-centric components of system 500 (FIG. 5), and the "why not try these" components of system 600 (FIG. 6). For example, system 700 includes a GUI element 710, a customization logic 720, a location logic 730, a user input logic 740, a user action logic 750, a system action logic 760, a response logic 770, a suggestions logic 780, and a recommendations logic 790. However, system 700 also includes a related message logic 795 and a ranking logic 799.

Related message logic 795 facilitates identifying a related message to present to the first user via the GUI element 710. The related message may be automatically identified based on a relationship between a set of first user actions and a set of actions taken by other users. In one example, the set of first user actions may be tracked over a period of time and may be analyzed with respect to frequency, count, and so on. For example, data concerning most frequently viewed message, most frequently viewed message content, most frequently posted to thread, most frequently posted to thread topic, most frequently read thread, most frequently read thread topic, most frequently replied to thread, most frequently replied to thread topic, and so on, may be gathered. In one example, the set of actions taken by other users is tracked over a period of time and is analyzed with respect to frequency, count, and so on. Relationships between these sets of actions may identify that the same message is in the top five most frequently viewed messages for a user and for other users of the system. This message may have a topic that is being actively discussed by other users in a different part of the DF. The other message may therefore be identified as a related message and provided to the user via the GUI element 710.

Ranking logic 799 facilitates identifying an ordered set of messages to present to the first user via the GUI element 710. In one example, the ordered set of messages may be selected based on a set of rankings provided by the first user. In another example, the ordered set of messages may be selected based on a set of rankings provided by other users, which may be analyzed alone and/or in combination with the rankings provided by the first user. The rankings may be collected over time and may refer to messages, threads, and so on. In one example, overlaps between a set of user rankings and a set of moderator, expert, or group rankings may be used to identify messages to which non-linear navigation paths can be provided through GUI element 710.

Figure 8:
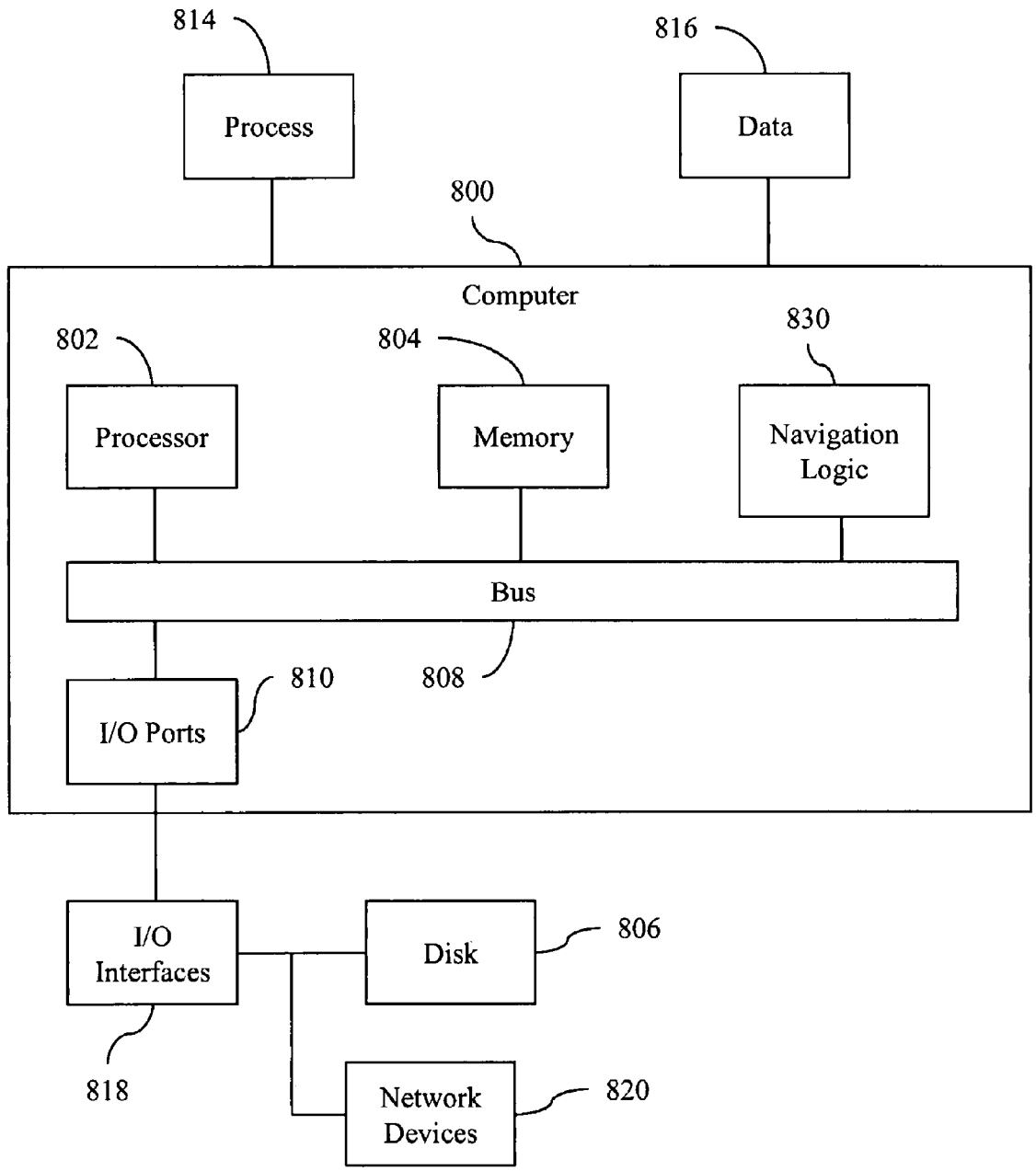
FIG. 8 illustrates an example computing environment in which example systems and methods illustrated herein may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a navigation logic 830 configured to facilitate non-linear navigation in a DF. Navigation logic 830 may therefore provide means (e.g., hardware, software stored on a machine-readable storage medium, firmware) for determining a current user state associated with a discussion forum session. In one example, the current user state may depend on a set of actions taken during a DF session. For example, the state may depend on messages read, messages posted, messages replied to, and so on. Navigation logic 830 may also provide means (e.g., hardware, software stored on a machine-readable storage medium, firmware) for establishing a relationship between the current user state and a second user state. The second user state may be associated with a set of actions taken during a second DF session. The set of actions taken during the second session may include actions taken by the current user and/or by other others. The actions may include, for example, viewings, postings, replies, and so on. Navigation logic 830 may also provide means (e.g., hardware, software stored on a machine-readable storage medium, firmware) for providing a non-linear navigation choice to the current DF user based on the relationship. The choice may include, for example, relocating to a favorite thread or message, relocating to an active thread or message, relocating to an automatically suggested thread or message, relocating to a user recommended thread or message, relocating to a highly ranked thread or message, and so on. While the logic 830 is illustrated as a hardware component attached to the bus 808, it is to be appreciated that in one example, the logic 830 could be implemented in the processor 802.

Generally describing an example configuration of the computer 800, the processor 802 may be a variety of various processors including dual microprocessor and other multiprocessor architectures. A memory 804 may include volatile memory (e.g., RAM) and/or non-volatile memory (e.g., ROM, PROM).

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, and/or a memory stick. Furthermore, the disk 806 may be a CD-ROM, a CD recordable drive (CD-R drive), a CD rewriteable drive (CD-RW drive), and/or a digital video ROM drive (DVD ROM). The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, SATA, Infiniband, 1394, USB, Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory machine-readable medium having stored thereon machine-executable instructions that if executed by a machine cause the machine to perform a method, the method comprising:
   maintaining in a tangible medium a location data to identify a first logical point in a discussion forum (DF) hierarchy to which a first user has navigated; and
   selectively manipulating a navigation control on a graphical user interface (GUI) based, at least in part, on the location data,
   the navigation control to provide access to a second logical point in the DF hierarchy that is not reachable from the first logical point in a single vertical navigation step, and where the navigation control includes a set of non-linear navigation options to provide access to a set of second logical points in the discussion forum hierarchy that include a second logical point that is updated automatically without intervention from a user and is based, at least in part, on an action of a different user than the first user in the discussion forum.

2. The machine-readable medium of claim 1, the method comprising:
   receiving a signal from the navigation control; and
   based on the signal, selectively relocating the first user to the second logical point in the DF hierarchy by manipulating the location data, where the second logical point is not currently available to the first user through the GUI using a single action.

3. The machine-readable medium of claim 1, where manipulating the navigation control includes manipulating a user-centric element on the GUI, where the user-centric element updates the second logical point in the DF hierarchy to which the navigation control provides access.

4. The machine-readable medium of claim 3, where the contents of the user-centric element depend, at least in part, on an action taken by the first user, the action taken by the first user comprising one or more of, viewing a message in the DF hierarchy, posting a message to the DF hierarchy, replying to a message in the DF hierarchy, establishing a bookmark to a message in the DF hierarchy, and establishing a link to a message in the DF hierarchy.

5. The machine-readable medium of claim 4, where the action taken by the first user is taken at a point in time that occurs inside a pre-determined period of time.

6. The machine-readable medium of claim 1, where manipulating the navigation control includes manipulating a system-centric element on the GUI, where the system-centric element updates the second logical point in the DF hierarchy to which the navigation control provides access.

7. The machine-readable medium of claim 6, where the contents of the system-centric element depend, at least in part, on an action taken by a user other than the first user, the action taken by the user other than the first user comprising one or more of, viewing a message in the DF hierarchy, posting a message to the DF hierarchy, replying to a message in the DF, establishing a bookmark to a message in the DF hierarchy, and establishing a link to a message in the DF hierarchy.

8. The machine-readable medium of claim 1, where manipulating the navigation control includes manipulating a user-system interaction element on the GUI, where the user-system interaction element updates the second logical point in the DF hierarchy to which the navigation control provides access.

9. The machine-readable medium of claim 8, where the contents of the user-system interaction element depend, at least in part, on a computer-generated suggestion for a message for the first user to view, and where the computer-generated suggestion updates the second logical point in the DF hierarchy to which the navigation control provides access.

10. The machine-readable medium of claim 9, where the computer-generated suggestion depends on a relation between an action of the first user and an action of a user other than the first user, and where the computer-generated suggestion concerns a location not currently available to the first user through the GUI using a single action.

11. The machine-readable medium of claim 8, where the contents of the user-system interaction element depend, at least in part, on a user-generated recommendation for a message for the first user to view, where the user-generated recommendation updates the second logical point in the DF hierarchy to which the navigation control provides access.

12. The machine-readable medium of claim 11, where the user-generated recommendation is based on a relation between an action of the first user and an action of a user other than the first user, and where the computer-generated suggestion concerns a location not currently available to the first user through the GUI using a single action.

13. The machine-readable medium of claim 1, where the navigation control is one of, a button, a menu, or an icon.

14. A non-transitory machine-readable medium having stored thereon machine-executable instructions that if executed by a machine cause the machine to perform a method, the method comprising:
   maintaining, in a tangible medium, location data to identify a first logical point in a discussion forum (DF) hierarchy to which a first user has navigated; and
   selectively manipulating a navigation control on a graphical user interface (GUI) based, at least in part, on the location data;
   where the navigation control provides access to a second logical point in the DF hierarchy that is not reachable from the first logical point in a single vertical navigation step, and where manipulating the navigation control includes automatically manipulating a rankings element on the GUI without intervention from a user, where the rankings element updates the navigation control to display a different second logical point in the DF hierarchy to provide access to a logical point not currently displayed and available to a user of the GUI.

15. The machine-readable medium of claim 14, where manipulating the rankings element depends on one or more of, a set of message rankings produced by the first user, and a set of message rankings produced by a user other than the first user.

16. The machine-readable medium of claim 15, where the contents of the rankings element include a pre-determined, configurable number of messages.

17. The machine-readable medium of claim 1, where manipulating the navigation control includes manipulating a related message element on the GUI.

18. The machine-readable medium of claim 17, where manipulating the related message element depends on a relation between a first data associated with the first user and a second data associated with a user other than the first user.

19. The machine-readable medium of claim 18, the first data comprising data concerning the first user viewing a message in the DF hierarchy, the first user posting a message to the DF hierarchy, the first user replying to a message in the DF hierarchy, the first user establishing a link to a message in the DF hierarchy, and the first user establishing a bookmark to a message in the DF hierarchy, and the second data comprising data concerning a second user viewing a message in the DF hierarchy, a second user posting a message to the DF hierarchy, a second user replying to a message in the DF hierarchy, a second user establishing a link to a message in the DF hierarchy, and a second user establishing a bookmark to a message in the DF hierarchy.

20. The machine-readable medium of claim 19, where manipulating the electronic navigation control includes manipulating a sponsor link navigation element on the GUI.

21. A machine-readable medium having stored thereon machine-executable instructions that if executed by a machine cause the machine to perform a method, the method comprising:
   maintaining in a tangible medium a location data to identify a first logical point in a discussion forum (DF) hierarchy to which a first user has navigated;
   selectively manipulating a navigation control on a graphical user interface (GUI) based, at least in part, on the location data, the navigation control being configured to provide access to a second logical point in the DF hierarchy that is not reachable from the first logical point in a single vertical navigation step;
   receiving a signal from the navigation control; and
   based on the signal, selectively relocating the first user to a second logical point in the DF hierarchy by manipulating the location data;
   where manipulating the navigation control includes manipulating a user-centric element on the GUI, where the contents of the user-centric element depend, at least in part, on an action taken by the first user, the action taken by the first user comprising one or more of, viewing a message in the DF, posting a message to the DF, replying to a message in the DF, establishing a bookmark to a message in the DF, and establishing a link to a message in the DF, and where the action taken by the first user is taken at a point in time that occurs inside a pre-determined period of time;
   where manipulating the navigation control includes manipulating a system-centric element on the GUI, and where the contents of the system-centric element depend, at least in part, on an action taken by a user other than the first user, the action taken by the user other than the first user comprising one or more of, viewing a message in the DF, posting a message to the DF, replying to a message in the DF, establishing a bookmark to a message in the DF, and establishing a link to a message in the DF;
   where manipulating the navigation control includes manipulating a user-system interaction element on the GUI, where the contents of the user-system interaction element depend, at least in part, on one or more of, a computer-generated suggestion for a message for the first user to view, and a user-generated recommendation for a message for the first user to view, where the computer-generated suggestion depends on a relation between an action of the first user and an action of a user other than the first user, and where the user-generated recommendation is based on a relation between an action of the first user and an action of a user other than the first user;
   where manipulating the navigation control includes manipulating a rankings element on the GUI, where manipulating the rankings element depends on one or more of, a set of message rankings produced by the first user, and a set of message rankings produced by a user other than the first user, the contents of the rankings element comprising a pre-determined, configurable number of messages; and
   where manipulating the navigation control includes manipulating a related message element on the GUI, where manipulating the related message element depends on a relation between a first data associated with the first user and a second data associated with a user other than the first user, the first data comprising data concerning the first user viewing a message in the DF, the first user posting a message to the DF, the first user replying to a message in the DF, the first user establishing a link to a message in the DF, and the first user establishing a bookmark to a message in the DF, the second data comprising data concerning a second user viewing a message in the DF, a second user posting a message to the DF, a second user replying to a message in the DF, a second user establishing a link to a message in the DF, and a second user establishing a bookmark to a message in the DF.

22. A non-linear navigation system for a discussion forum (DF), comprising:
   a graphical user interface (GUI) element stored on a machine readable storage medium to display a set of non-linear navigation options to a DF user and to receive a non-linear navigation signal;
   a location logic to determine a location to which a first user has navigated in a DF, the location being one of, a thread, and a message;
   a user input logic to receive a signal from the first user through the GUI element, and in response to receiving the signal, selectively updating the set of non-linear navigation options in the DF that cannot be reached in a single vertical navigation step from the location to which the first user has navigated in the DF, where the signal received from the first user being related to one or more of, providing a ranking for a message, establishing a bookmark associated with a message, and establishing a link to a message;
   a user action logic to identify a DF action taken by the first user that includes interacting with a message in the DF; and
   a customization logic to selectively customize the GUI element based, at least in part, on one or more of, the non-linear navigation signal, the signal received from the user input logic, and the DF action identified by the user action logic, where customizing the GUI element comprises updating the set of non-linear navigation options in the DF that cannot be reached in a single vertical navigation step from the location to which the first user has navigated in the DF.

23. The system of claim 22, the DF action taken by the first user including one or more of, viewing a message in the DF, posting a message to the DF, and replying to a message in the DF.

24. The system of claim 23, including:
a system action logic to identify an action taken by a system user other than the first user; and
a response logic to identify a response of a second user to a message posted by the first user,
the customization logic to selectively customize the GUI element based, at least in part, on one or more of, the action identified by the system action logic, and the response identified by the response logic, where customizing the GUI element comprises providing a non-linear navigation target in the DF that cannot be reached in a single vertical navigation step from the location to which the first user has navigated in the DF.

25. The system of claim 24, the action taken by the system user including one or more of, viewing a message in the DF, posting a message to the DF, replying to a message in the DF, establishing a bookmark to a message in the DF, and establishing a link to a message in the DF.

26. The system of claim 25, including:
a suggestions logic to identify a suggested message to present to the first user via the GUI element, where the suggested message is automatically identified based on a set of first user actions, where the suggested message is provided as a non-linear navigation target in the DF, and where the non-linear navigation target cannot be reached in a single vertical navigation step from the location to which the first user has navigated in the DF; and
a recommendations logic to identify a recommended message to present to the first user via the GUI element, where the recommended message is provided by a user other than the first user, where the recommended message is provided as a non-linear navigation target in the DF, and where the non-linear navigation target cannot be reached in a single vertical navigation step from the location to which the first user has navigated in the DF.

27. The system of claim 26, including:
a related message logic to identify a related message to present to the first user via the GUI element, where the related message is automatically identified based on a relationship between the set of first user actions and a set of actions taken by other users, where the related message is provided as a non-linear navigation target in the DF, and where the non-linear navigation target cannot be reached in a single vertical navigation step from the location to which the first user has navigated in the DF; and
a ranking logic to identify an ordered set of messages to present to the first user via the GUI element, where the ordered set of messages is selected based on a set of rankings provided by the first user, where the ordered set of messages are provided as a non-linear navigation target in the DF that cannot be reached in a single vertical navigation step from the location to which the first user has navigated in the DF.

28. The system of claim 27, where the set of actions taken by other users is to be tracked over a period of time and is to be analyzed with respect to one or more of, message viewing frequency, message viewing count, topic viewing frequency, topic viewing count, thread posting frequency, thread posting count, thread referencing frequency, thread referencing count, message referencing frequency, and message referencing count.

29. The system of claim 28, where the set of first user actions are to be tracked over a period of time and are to be analyzed with respect to one or more of, message viewing frequency, message viewing count, topic viewing frequency, topic viewing count, thread posting frequency, thread posting count, thread referencing frequency, thread referencing count, thread reply frequency, thread reply count, message reply frequency, message reply count, message referencing frequency, and message referencing count.

30. A non-transitory machine-readable medium having stored thereon machine-executable instructions that if executed by a machine cause the machine to perform a method, the method comprising:
identifying a location in a discussion forum to which a user has navigated, where the discussion forum is arranged as a linear hierarchy;
providing a non-linear navigation option that is one of, a button, a menu, or an icon to the user in a graphical user interface associated with the discussion forum based, at least in part, on the location where providing the non-linear navigation option includes automatically providing a set of non-linear navigation options without intervention from a user that includes an option based, at least in part, on an action of a different user than the user in the discussion forum; and
updating the graphical user interface to display a second location in the discussion forum in response to the user selecting the non-linear navigation option by performing a non-linear horizontal navigation of the discussion forum linear hierarchy.

31. The machine-readable medium of claim 30, where the second location is not reachable from the first location in a single vertical navigation step.

32. The machine-readable medium of claim 30, where providing the set of non-linear navigation options to the user is based, at least in part, on one or more of, an action of the user, an action of at least one different user, or an action between the user and the at least one different user.

\* \* \* \* \*